United States Patent

Busch et al.

Patent Number: 5,281,687
Date of Patent: Jan. 25, 1994

[54] POLYSILOXANES WITH AT LEAST ONE SULFATOHEXYL GROUP LINKED BY AN SI-C BOND

[75] Inventors: Stefan Busch, Essen; Peter Lersch, Oberhausen; Dietmar Schaefer, Hattingen; Dietmar Wewers, Bottrop, all of Fed. Rep. of Germany

[73] Assignee: Th. Goldschmidt AG, Essen, Fed. Rep. of Germany

[21] Appl. No.: 987,853

[22] Filed: Dec. 9, 1992

[30] Foreign Application Priority Data

Dec. 13, 1991 [DE] Fed. Rep. of Germany ....... 4141046

[51] Int. Cl.$^5$ .............................................. C08G 77/04
[52] U.S. Cl. ..................................... 528/25; 556/428
[58] Field of Search ............................. 528/25; 556/428

[56] References Cited

U.S. PATENT DOCUMENTS 3,412,129  11/1968  Holdstock ............................. 528/25
4,342,742   8/1982  Sebag et al. ......................... 556/428

FOREIGN PATENT DOCUMENTS 1157789  11/1963  Fed. Rep. of Germany.
1595775   2/1970  Fed. Rep. of Germany.

Primary Examiner—Melvyn I. Marquis
Attorney, Agent, or Firm—Anderson Kill Olick & Oshinsky

[57] ABSTRACT

Polysiloxanes of the general formula

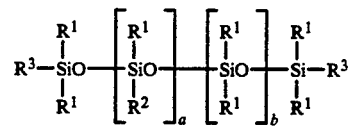

which contain at least one sulfatohexyl group linked by an Si—C bond are prepared wherein $R^1$ is a methyl or phenyl group with the proviso that at least 90% of the $R^1$ groups are methyl groups, $R^2$ either is identical with $R^1$ or is $-(CH_2)_6-OSO_3^-\cdot M^+$, $M^+$ being an alkali, $\frac{1}{2}$ alkaline earth or optionally an alkyl-substituted ammonium ion, $R^3$ is identical with $R^1$ or $R^2$, with the proviso that at least one $R^2$ or $R^3$ group in the average molecule is a $-(CH_2)_6-OSO_3^-\cdot M^+$ group, "a"=0 to 5 and b=0 to 5. A method for the synthesis of these compounds and their use as hydrolysis-resistant surfactants is also described.

4 Claims, No Drawings

POLYSILOXANES WITH AT LEAST ONE SULFATOHEXYL GROUP LINKED BY AN SI-C BOND

FIELD OF INVENTION

The invention is directed to polysiloxanes with at least one sulfatohexyl group linked by an SiC bond, methods for their synthesis and their use as hydrolysis-resistant surfactants.

BACKGROUND INFORMATION AND PRIOR ART

The German patent 11 57 789 discloses a method for the synthesis of organosilicon compounds which contain the group

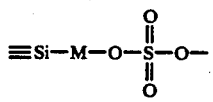

(M=any divalent, optionally halogenated hydrocarbon group). The distinguishing feature of the synthesis involves reacting compounds carrying the ≡Si—M—O—X group (X=hydrogen or an acyl group) with sulfuric acid, sulfur trioxide, chlorosulfonic acid or amidosulfonic acid at temperatures up to 180° C. and the reaction products are optionally equilibrated and/or hydrolyzed. As starting organosilicon compound, organopolysiloxanes of the general formula

are used, wherein M is as defined above and R represents any, optionally halogenated hydrocarbon group or hydrogen, n and m have a value of 0 to 3 and x, y and z can assume any value.

In the specification and examples, the linear groups —C$_3$H$_6$—, —C$_3$H$_5$Cl— and C$_4$H$_8$— are explicitly used as the M group. The compounds can be converted into their salts, particularly into their ammonium salts. They are suitable for impregnating textiles, leather, glass, wood or masonry and can be used as emulsifiers or as substances with detergent properties.

The German Offenlegungsschrift 15 95 775 discloses sulfate group-containing organosilicon compounds of the general formula

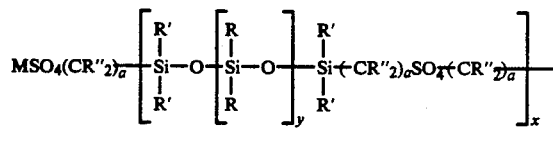

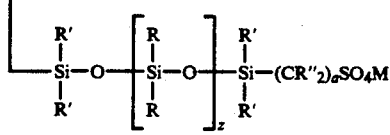

in which M is sodium or potassium, R is an alkyl group with 1 to 3 carbon atoms, R' is a univalent hydrocarbon group with more than 7 carbon atoms and free of aliphatic unsaturations, R" is the same as R' or hydrogen, "a" is a number from 3 to 8, x is zero or a number from 1 to 10 and y is zero or a number from 1 to 150. These compounds are comparable to those of the German Patent 11 57 789. In the German patent 11 57 789, methods are described for the synthesis of organopolysiloxanes which have lateral sulfatoalkyl groups. On the other hand, the compounds described in the German Offenlegungsschrift 15 95 775 are analogous compounds which have the sulfatoalkyl groups in the α, ω position.

Surprisingly, it has now been found that the salts of the corresponding hexyl sulfate esters combine outstanding surfactant properties with above average resistance to hydrolysis. This behavior could not have been anticipated by extrapolating the properties of the next lower or next higher homologous alkyl sulfate ester and is therefore surprising to those skilled in the art.

OBJECTS OF THE INVENTION

An object of the invention is polysiloxane of the general formula

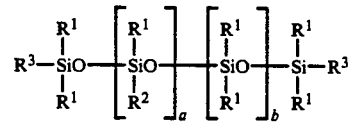

wherein

R$^1$ is a methyl or phenyl group, at least 90% of the R$^1$ groups being methyl groups, R$^2$ is the same as R$^1$ or —(CH$_2$)$_6$—OSO$_3^-$.M$^+$, wherein M$^+$ is an alkali metal ion, ½ alkaline earth metal ion or, optionally, an alkyl-substituted ammonium ion, R$^3$ is the same as R$^1$ or R$^2$, with the proviso that, in the average molecule, at least one R$^2$ or R$^3$ group is a —(CH$_2$)$_6$—OSO$_3^-$.M$^+$ group, a=0 to 5, and b=0 to 5.

Another object of the invention is the synthesis of said polysiloxanes.

Yet another object of the invention is the use of the inventive compounds as hydrolysis-resistant surfactants, particularly as emulsifiers; for modifying the properties of surfaces, for example, as additives in antistatic finishes or for impregnating, as outstanding wetting agent in aqueous solutions already at very low concentrations; as auxiliary or additive or synergistic formulation component in thickening agents, antistats, textile processing aids, photographic films, detergents, industrial cleaners, ion-selective electrodes; in galvanic technology; for tertiary petroleum production; in fire extinguishers; in foam stabilizers, high-speed printing inks, adhesives and water-soluble dyes.

SUMMARY OF THE INVENTION

Particularly preferred are polysiloxanes in which the groups, superscripts and subscripts, alone or in combination, have the following meaning or values:

R$^1$ is the methyl group,

M$^+$ is an alkylammonium ion in which the alkyl group has 1 to 10 carbon atoms, R$^3$ is the same as R$^1$, a=0 or 1, and b=0.

Inventive compounds, in which M+ is an alkylammonium ion with 1 to 4 carbon atoms, have a low viscosity and are therefore handled particularly easily. They form heavily foaming aqueous solutions. As the number of carbon atoms in the alkylammonium group increases, the tendency to foam in aqueous solutions decreases. This is of particular interest for industrial applications.

A further object of the invention is the synthesis of the polysiloxanes, selected pursuant to the invention, and is characterized in that polysiloxanes of the general formula

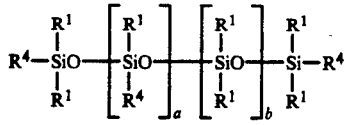

wherein $R^1$, "a" and b are defined as above, $R^4 = R^1$ or $-(CH_2)_6-OH$, with the proviso that at least one $R^4$ group in the average molecule is a $-(CH_2)_6-OH$ group, are reacted at room temperature or at a moderately elevated temperature with, based on the $-(CH_2)_6-OH$ groups, at least equimolar amounts of amidosulfonic acid and the ammonium ion is optionally exchanged for the desired M+ ion by known procedures.

The method can be carried out in the presence of an inert solvent. An example of a suitable solvent is N-methylpyrrolidone or dimethylformamide.

The reaction begins at room temperature, but can be accelerated by heating to moderately elevated temperatures, such as about 40° to 90° C. The ammonium salt, formed during the reaction, can easily be converted into the corresponding alkylammonium salt by a metathesis reaction with alkylamines, ammonia being evolved in the process. The properties of the sulfate ester salts obtained can be modified, particularly with respect to the wetting and foaming capabilities, by using the appropriate alkylamines.

It is known that the critical micelle concentration (cmc) in aqueous solutions, which is an important quantity for characterizing the surfactant behavior of a compound, depends on the degree of bonding of the counter ion to the rest of the surfactant molecule. For example, the cmc of the surfactant decreases due to a stronger bonding of the counter ion to the rest of the surfactant molecule. The degree of bonding depends on the polarizability, the valence and the hydrate sheath of the counter ion. The surfactant-specific properties, such as the foaming and wetting capabilities, the solubility and the surface tension lowering of a compound are therefore affected not only by the surfactant rest, but also by the counter ion. It is therefore understandable that, in view of the plurality of organic alkylammonium cations available and the technically very simple method of converting the claimed compound into the corresponding alkylammonium derivatives, it is of course also possible to synthesize a plurality of compounds with valuable application properties.

In the following examples, the synthesis of the inventive compounds is explained in even greater detail and their special properties are shown. It should be understood that these examples are given by way of illustration and not by way of limitation.

1. SYNTHESIS OF THE STARTING COMPOUNDS

To begin with, the trisiloxane derivative, which serves as educt, is synthesized for the inventive method by a known procedure.

For this purpose, 225 g (1.0 mole) of 1,1,1,3,5,5,5-heptamethyltrisiloxane and 9.2 mg (=20 ppm Pt) of hexachloroplatinic acid $H_2PtCl_6$ are added to a 500 mL 4-neck flask, equipped with stirrer, dropping funnel, thermometer and reflux condenser and heated with stirring to 120° C. At this temperature, 115 g (1.15 moles) of 5-hexen-1-ol are added dropwise at such a rate that a temperature of 140° C. is not exceeded despite the exothermic reaction, which sets in. After the addition, the reaction mixture is kept at 120° C. and the time-conversion ratio is followed by checking the SiH value. When the conversion exceeds 99%, the reaction is stopped and the platinum catalyst residues are removed from the reaction mixture by filtration. Excess hexenol and volatile by-products are distilled off under vacuum. Analytical investigations by means of $^1$H-, $^{13}$C- and $^{29}$Si-NMR confirm that the hydrosilylation product has the expected structure $Me_3SiO(HOCH_2(CH_2)_4CH_2SiMeO)SiMe_3$.

2. SYNTHESIS OF THE INVENTIVE COMPOUNDS

EXAMPLE 1

The 3-(1-hydroxyhexyl)-2-methyl-1,1,5,5-tetramethylsiloxane (300 g, 0.92 moles), synthesized in Example 1, is mixed while stirring with 75 g N,N-dimethylformamide in a 3-neck flask equipped with stirrer, powder funnel and nitrogen inlet tube. After that, air is removed from the reaction vessel by passing in nitrogen. Under an atmosphere of nitrogen, 93.9 g (0.97 moles, 5% excess) of finely powdered amidosulfonic acid is added with stirring. After that, the temperature is raised to 75° C. within 30 minutes and stirring is continued at this temperature for a further 5 hours. During this time, there is a slight exothermic reaction and the contents of the flask thicken to a white-yellow pasty mass. At the end of the reaction, the reaction mass is mixed with stirring with 60 g of i-propanol and unreacted amidosulfonic acid residues are filtered from the hot product. The acid groups in the product are neutralized by passing gaseous ammonia for a short period into the reaction mass. After that, N,N-dimethylformamide, i-propanol and by-products of the reaction, such as hexamethyldisiloxane, are distilled off under vacuum at a pressure of about 2 torr and at temperatures of 70° to 80° C.

Spectroscopic analyses by means of $^1$H-, $^{13}$C- and $^{29}$Si-NMR show that the sulfating conversion is 99.2% and that the reaction product corresponds essentially to the expected structure $Me_3SiO(NH_4^+ -O_3SOCH_2(CH_2)_4CH_2SiMeO)SiMe_3$. Since partial degradation reactions of the siloxane chain, during which hexamethyldisiloxane is split off, take place under the reaction conditions, small amounts of oligomers of the M-D'$_n$-M type, with n=2 to 5 and D'=$NH_4^+ -O_3SOCH_2(CH_2)_4CH_2SiMeO$ may also be found in the product. This becomes clear when the product is analyzed for surfactant sulfur content, since the value of 7.4% is a little higher than the theoretical value of 7.1%.

The ammonium heptamethyltrisiloxanehexyl sulfate, which is obtained in 85% yield, dissolves in water to form a clear solution, foams very strongly when shaken and has outstanding wetting properties. As shown below, measurements of the static surface tension of these aqueous solutions already at low concentrations of reaction product show excellent surfactant activity, which is expressed in a particularly effective lowering of surface tension.

| Concentration (% by weight) | Surface Tension (mN/m) (T = 20° C.) |
|---|---|
| 1.0 | 19.8 |
| 0.25 | 20.1 |
| 0.10 | 20.2 |
| 0.025 | 21.1 |

Comparison Example

Hydroxyalkyl-functional trisiloxane derivatives, as further starting compounds, are synthesized as described above by a known procedure by the platinum-catalyzed addition reaction of allyl alcohol, 3-buten-1-ol or 10-undecen-1-ol with heptamethyltrisiloxane. Subsequently, these starting compounds are also sulfated with amidosulfonic acid and converted into the corresponding ammonium compounds. The control compounds, so synthesized, were compared with respect to their surfactant properties with the reaction product of Example 1.

For this purpose, 1 percent by weight aqueous solutions were prepared with the products and the surface tension of these solutions were determined. To determine the wetting capability, the spreading of a 50 μL droplet of the 1% surfactant solution on a polypropylene sheet was measured by determining the maximum area over which the drop spread. Under these conditions, pure water supplied a blank value of 8 mm. The long-term hydrolysis stability is also determined by this method: it is given as the period in which a droplet of the aged solution still reaches the initial spreading value.

The results are given in the following Table.

| Product | Solution | Surface Tension (mN/m) | Spreading (mm/PP-Folie) | Long-term Hydrolysis Test (20° C.,pH 7) |
|---|---|---|---|---|
| Example 1 | Clear | 19.8 | 65 | >120 days |
| HMTS-C$_3$—SO$_4$ | Slightly cloudy | 20.1 | 35 | 14 days |
| HMTS-C$_4$—SO$_4$ | Clear | 20.7 | 40 | 21 days |
| HMTS-C$_{11}$—SO$_4$ | Cloudy | 23.7 | 20 | n.d.* |

*n.d. = not determined

It can be seen that, while all products have surfactant properties, only the ammonium salt of trisiloxyhexyl sulfate (Example 1) has outstanding spreading values combined, at the same time, with exceptional long-term hydrolysis stability.

EXAMPLE 2

The sulfated trisiloxane-hexenol adduct (100 g, 0.24 moles), synthesized as described in Example 1, is added to a solvent mixture of 15.3 g (0.26 moles) of N-isopropylamine and 20 g of isopropanol and stirred at room temperature for 2 hours. During this time, ammonia gas is evolved and the viscosity of the creamy formulations decreases as the reaction time increases. After 2 hours, the excess of 1-propylamine is removed at 50° C. under a slight vacuum and a liquidy, viscous, clear, yellow end product is obtained. The product dissolves very readily in water and also has outstanding surfactant properties.

EXAMPLE 3

In a manner similar to that described in Example 2, the ammonium salt of trisiloxanehexyl sulfate can also be converted by various organic amine bases into the corresponding alkyl ammonium salts. Through this modifying step, products with varied properties in respect to surface tension lowering and foaming and wetting properties become accessible, as is evident from the following Table:

| Counterion | Appearance (Pure Product) | Surface Tension (1% in H$_2$O) (mN/m) | Wetting Value (1% in H$_2$O) (mm) | Foam Height (0.1% in H$_2$O) (mm), after: | | |
|---|---|---|---|---|---|---|
| | | | | 30s | 180s | 300s |
| NH$_4^+$ | pasty | 19.8 | 65 | 180 | 145 | 90 |
| (iC$_3$H$_7$)NH$_3^+$ | liquid/viscous | 19.8 | 55 | 175 | 130 | 90 |
| (C$_8$H$_{17}$)NH$_3^+$ | pasty | 21.2 | 58 | 20 | 12 | 6 |
| (CH$_3$)(C$_4$H$_9$)NH$_2^+$ | liquid/viscous | 20.2 | 61 | 175 | 150 | 115 |
| (C$_2$H$_5$)$_3$NH$^+$ | viscous | 21.7 | 66 | 140 | 100 | 60 |
| (CH$_3$)$_2$—C(CH$_2$OH)—NH$_3^+$ | highly viscous | 20.9 | 64 | 170 | 130 | 65 |

What we claim is:

1. Polysiloxane of the general formula

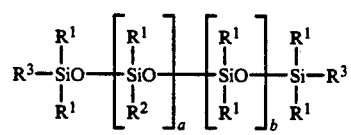

wherein

R$^1$ is a methyl or phenyl group, at least 90% of the R$^1$ groups being methyl groups, $R^2$ is the same as $R^1$ or $-(CH_2)_6-OSO_3^-\cdot M^+$, wherein $M^+$ is an alkali metal ion, ½ alkaline earth metal ion or, an alkyl-substituted ammonium ion, $R^3$ is the same as $R^1$ or $R^2$, with the proviso that, in the average molecule, at least one $R^2$ or $R^3$ group is a $-(CH_2)_6-OSO_3^-\cdot M^+$ group, $a = 0$ to 5, and $b = 0$ to 5.

2. The polysiloxanes of claim 1, wherein $R^1$ is a methyl group $M^+$ is an alkyl ammonium ion, the alkyl group of which has 1 to 10 carbon atoms, $R^3$ is identical with $R^1$, $a = 0$ or 1 and $b = 0$.

3. A surfactant containing effective amounts of polysiloxane of claim 1 or 2 to render the surfactant hydrolysis-stable.

4. A preparation comprising an effective amount of a surfactant which is hydrolysis-stable, said surfactant being polysiloxane of claims 1 or 2.

* * * * *